June 10, 1958 — A. G. SCHRAMM — 2,838,191
ELEVATABLE BED VEHICLE
Filed June 11, 1957 — 4 Sheets-Sheet 1

INVENTOR.
Arthur G. Schramm
BY Scott L. Norvell
ATTORNEY

June 10, 1958  A. G. SCHRAMM  2,838,191
ELEVATABLE BED VEHICLE
Filed June 11, 1957  4 Sheets-Sheet 2
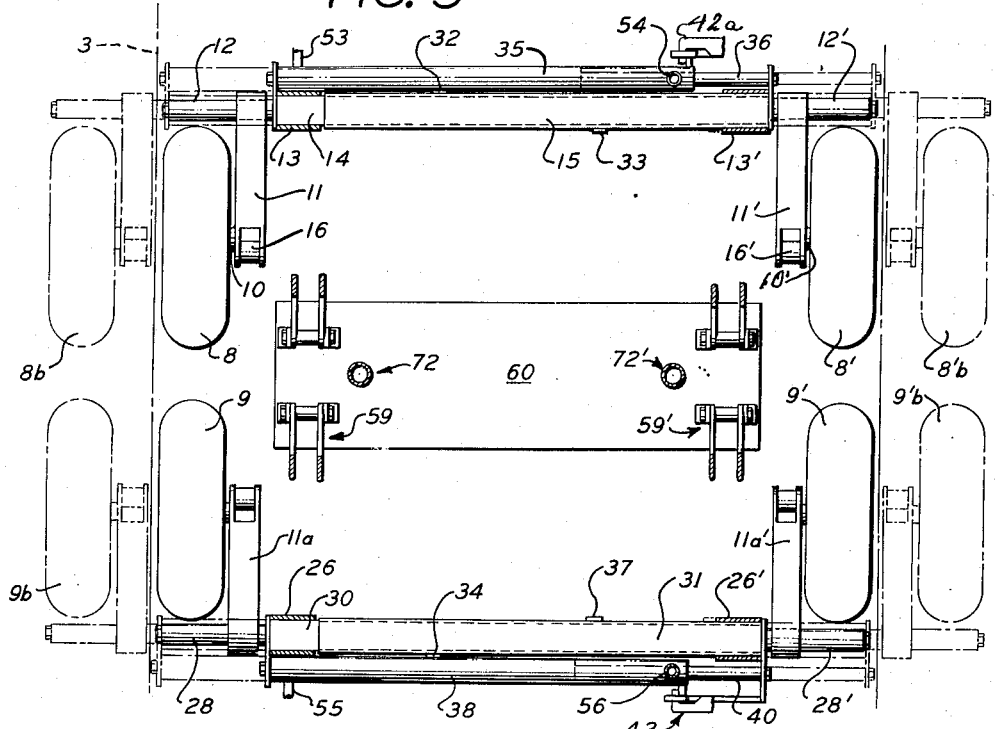
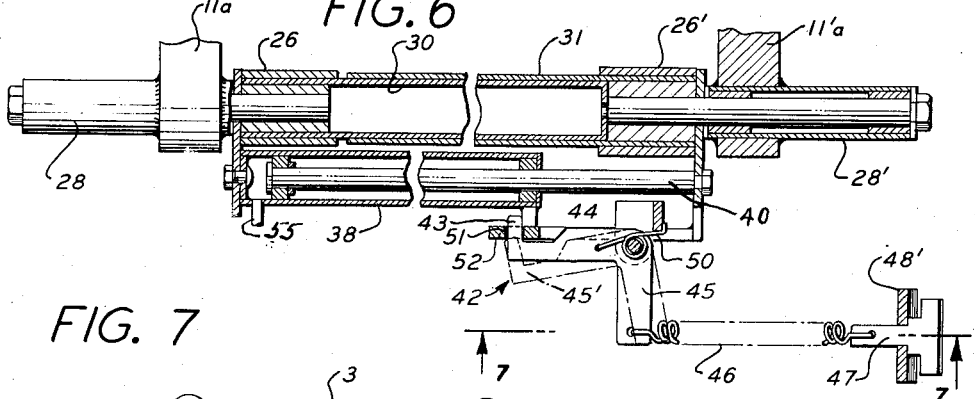
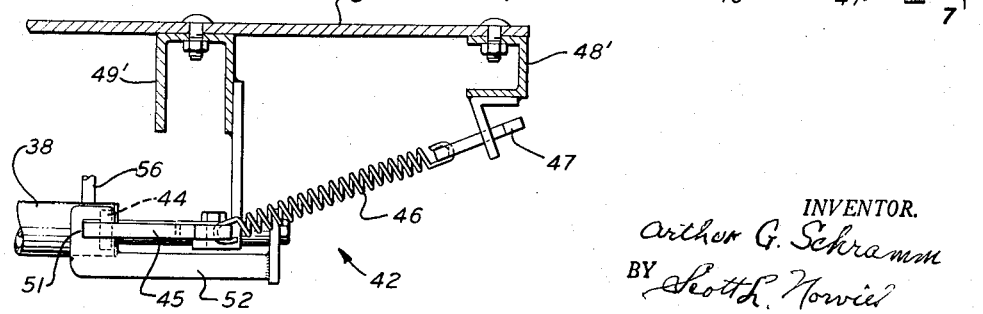
INVENTOR.
Arthur G. Schramm
BY
ATTORNEY

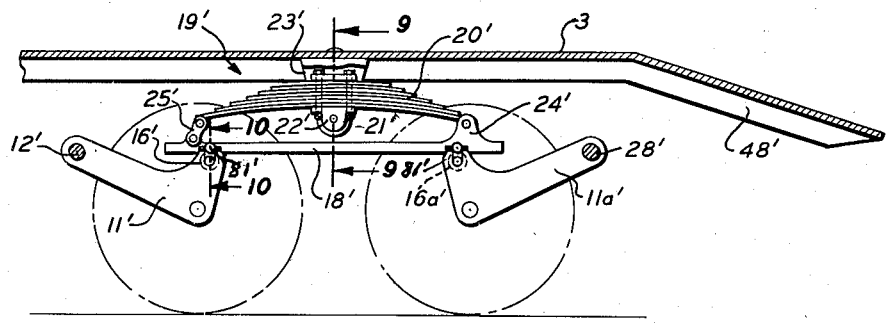
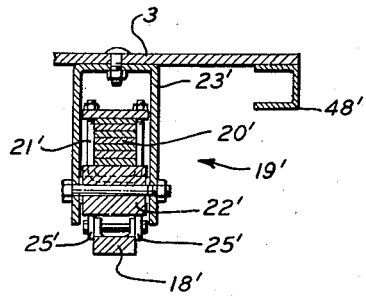
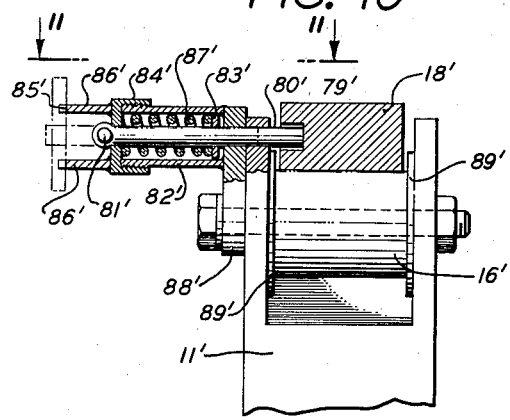
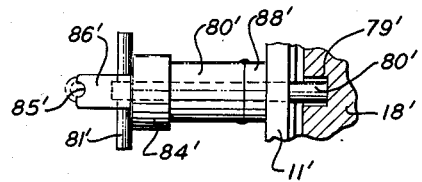

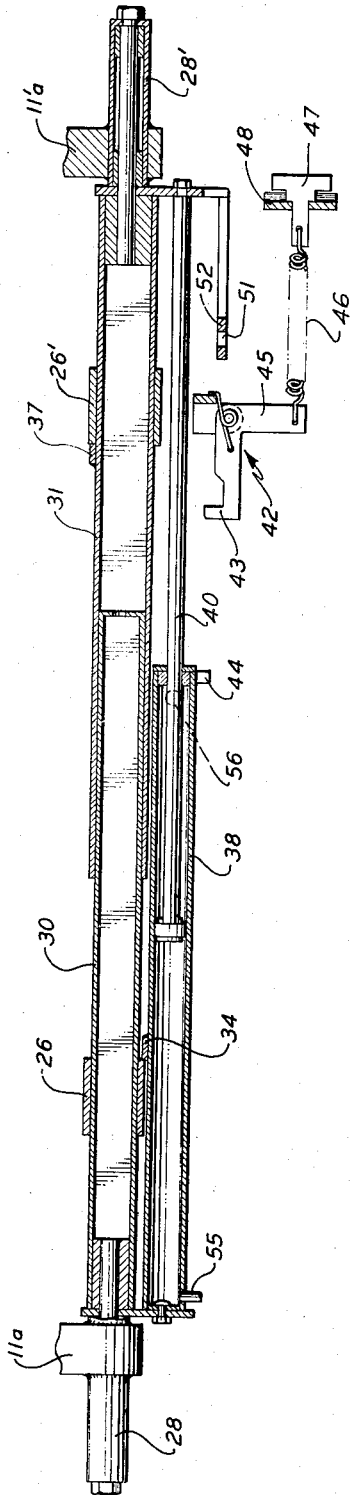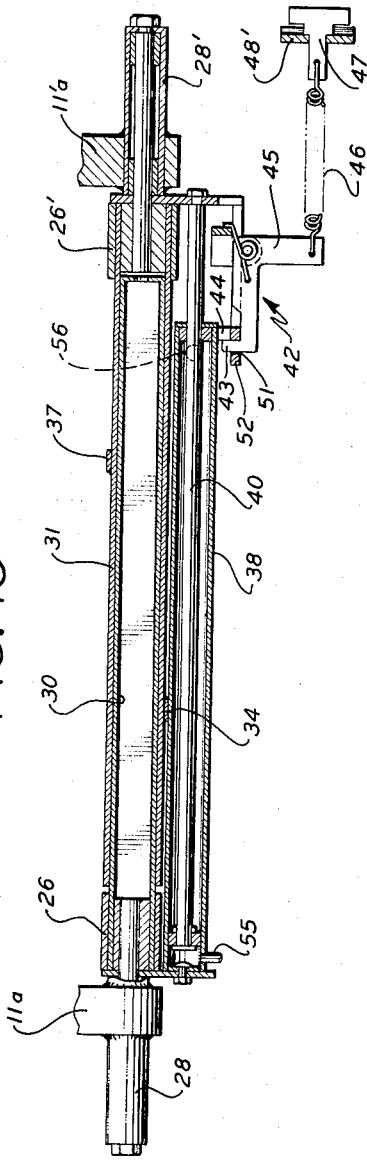

United States Patent Office 2,838,191
Patented June 10, 1958

2,838,191

ELEVATABLE BED VEHICLE

Arthur G. Schramm, Phoenix, Ariz.

Application June 11, 1957, Serial No. 664,975

5 Claims. (Cl. 214—505)

This invention concerns elevatable bed vehicles.

More particularly, the invention concerns a vehicle for transporting heavy loads of material and/or large, heavy objects, which vehicle has a wide bed which can be lowered at the rear end to facilitate loading and unloading of heavy objects onto the bed.

A further object of the invention is to provide mechanism for raising and lowering the rear end of the bed of a vehicle which will enable the running gear to be moved out from under the bed so that in raised position the running gear may have a tread equal to standard width, whereas the bed in raised position may be of the maximum width permitted by law, and when in lowered position the wheels may be moved laterally out from under the bed while the bed is lowered until it substantially rests upon the ground.

A further object of the invention provides for mechanism including a large jack operating beneath the vehicle bed which will take the load off the wheels and sustain the bed in raised position while the wheels, including a portion of their suspension mechanism, are moved by hydraulic jacks laterally outward and beyond the edges of the bed, and will then lower the bed until the underneath portions thereof rest upon the ground; said jack being adapted to raise the vehicle bed after it is loaded to a running position and thereby enable the wheels to be moved back beneath the bed to the normal tread width.

Other objects will appear hereinafter.

I attain the foregoing objects by means of the mechanisms, parts, and combinations of parts illustrated in the accompanying drawings, in which:

Figure 5 is a plan view of the lifting mechanism of the bed, together with the wheel supporting and extension mechanism in part, as would appear when taken on line 5—5 Figure 4.

Figure 6 is a plan view of the wheel supporting and laterally extending mechanism, with portions thereof sectioned to show interior construction, and drawn on a further enlarged scale;

Figure 7 is a section of the wheel extending latch mechanism, taken substantially on a section indicated by line 7—7, Figure 6.

Figure 8 is a side elevation of the rear portion of the trailer bed showing the wheel suspension and springing mechanism, with the bed edge portion sectioned off to show the interior construction; and Figure 9 is a section of the wheel suspension and springing mechanism as shown in Figure 8, with a section taken substantially on line 9—9 of Figure 8.

Fig. 10 is a fragmentary section of the latch mechanism.

Fig. 11 is a plan view of Fig. 10.

Figure 12 is a somewhat enlarged sectional elevational view of the axle structure shown in Figure 6 but with the moving parts in an expanded position; and Figure 13 is a view taken similar to that of Figure 12 with the parts sectioned to show the interior and with the moving parts in contracted position.

Similar numerals refer to similar parts in the several views.

Figure 1:
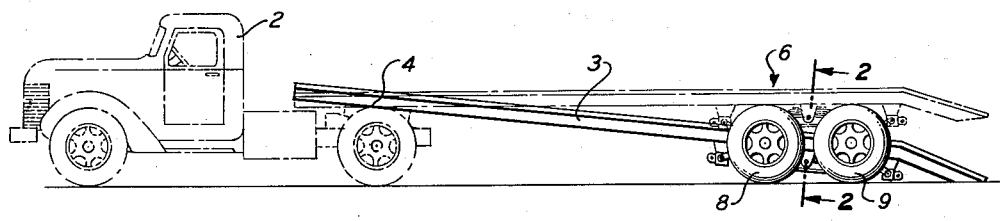
Figure 1 is a side elevation of a semi-trailer type truck having tandem rear wheels, supported on mechanisms incorporating my invention.

In general, 2 indicates the body and tractive mechanism of a semi-trailer, 3 indicates the body bed of the drawn or trailed portion thereof, and 4 indicates the turntable coupler commonly used on vehicles of this type to attach the drawn portion to the tractive portion. 6 indicates in general the wheeled supporting mechanism for the rear end of the body bed 3 which contains mechanism embodying the subject matter, parts, and combinations of parts of this invention.

In the form shown in the drawings there are tandem wheels 8 and 9 on the left side of the bed and similar wheels 8' and 9' on the right side (Figure 5). The mechanism which supports the wheels is the same on each side of the bed, considering that these mechanisms are left and right counterparts. Parts on the right side are indicated hereinafter by primed numbers where they correspond to the parts on the left side. Throughout the specification it is to be understood that if a part is shown only on one side, using either a digit or primed number, there is a corresponding opposite counterpart on the other side unless otherwise indicated.

The forward wheels 8 and 8' of each tandem pair of wheels are supported on spindles 10 and 10' which are, in turn, carried on wheel arms 11 and 11', pivotally supported on stub shafts 12 and 12'. These shafts are supported on telescoping tubes 14 and 15, respectively, which have square sections.

Each of the arms has a shoe riding roller 16 which is adapted to contact and be pressed downwardly by shoe plates 18 and 18' of the spring assemblies 19 and 19'. It is to be noted that spring 20' extends fore and aft on the right side of the body, as best illustrated in Figures 8 and 9. The center of the spring is clamped by U clamps 21' which secure the central portion of the spring to a thimble 22' which is held in a U-shaped bracket 23' attached to and extending downward from the under face of bed 3. It should be understood that there is a left hand counterpart of this structure indicated by numerals without primes.

Shoe 18 is pivotally attached by lugs to the rear end of spring 20 and the front end of the shoe is attached to the front end of the spring by shackle 25.

As shown in Figures 8 and 10, the forward portion of shoe 18' rests on the spring support roller 16' while the rear portion of shoe 18' rests upon the spring support roller 16'a which is on the forwardly extending rear wheel arm 16'a. Each of the rear wheel arms 11a and 11'a is supported on stub shafts 28 and 28' which are supported in inner and outer positions, respectively, on telescoping tubes 30 and 31.

Figure 3:
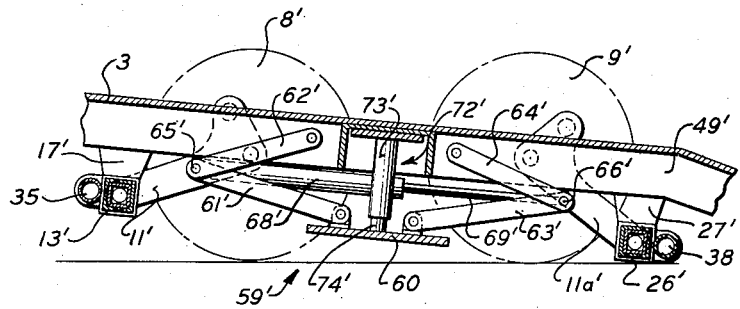
Figure 3 is a side sectional view of the rear portion of the bed of the vehicle, together with the bed lifting mechanism and portions of the wheel suspension mechanism drawn on an enlarged scale; said section being taken substantially on line 3—3, Figure 2.
Figure 4:
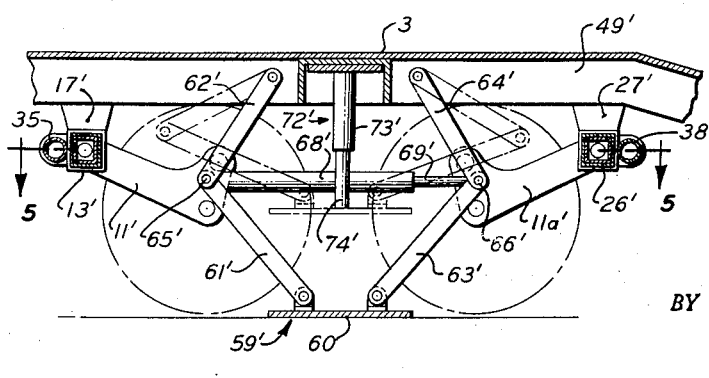
Figure 4 is a view of the rear portion of the bed lifting mechanism and wheel suspension taken on a line similar to Figure 3, but in raised position.

Telescoping tubes 30 and 31 are slidably held by supports 26 and 26' which are attached to bed 3 by brackets 27 and 27'. (Figures 3 and 4). This structure enables the wheels supported on the respective wheel arms to move outward from the position shown in solid lines, Figure 5, to the position shown in dotted lines as indicated at 8b and 8'b for the forward wheels and as 9b and 9'b for the rear wheels of each tandem set. Telescoping tubes 14 and 15 which support the stub shafts 12 and 12', respectively, are slidably held by supports 13 and 13' which are, in turn, attached to bed 3 by brackets 17 and 17'.

It will be noted that the wheel support structure for the forward wheels is a fore and aft counterpart of the structure for the rear wheels.

Outward movement of tubes 14 and 15 is limited by stops 32 and 33 which contact supports 13 and 13', respectively. The outward movement of tubes 30 and 31 is limited by stops 34 and 37 which contact supports 26 and 26', respectively.

Mechanism for moving the wheels out and in from the two positions indicated, consists of the hydraulic cylinder 35 which is attached to telescoping tube 14 and the piston rod 36 which is attached to the tube 15 of the telescoping pair of tubes included in the assembly for forward wheels 8 and 8'. This hydraulic cylinder 35 is operated through lines 53 and 54. Similarly, so far as the rear wheels of the tandem set are concerned, the hydraulic cylinder 38 is attached to telescoping tube 30 and piston rod 40 is attached to telescoping tube portion 31. Hydraulic cylinder 38 is provided with connections to fluid lines 55 and 56.

In order to maintain the telescoping portions, above described, in contracted relation, I provide the latch 42 which has a finger 43 which engages lug 44 on cylinder 38 and also enters opening 51 in stop arm 52 on piston 40, all as shown particularly in Figure 6. A similar latch, indicated by numeral 42a, is attached to and operates on cylinder 35. Finger 43 is on the forward portion of latch-bell crank 45. The opposite arm of this bell-crank is attached to a spring 46, and this is, in turn, provided with a T-shaped handle 47 which extends outward from the side support 48' of the bed 3. An outward pull on handle 47 will tend to overcome the urge of the bell-crank 60 and will move the crank from the latched position indicated in solid lines, Figure 6, to the unlatched position indicated by dotted lines 45'. This movement releases the finger from both the lug 44 and the opening 51 and permits cylinder 38 to move outward and piston 40 to move outward and away from cylinder 38.

In order to raise and lower bed 3 so that the lateral outward and inward movement of the wheel support mechanism, above described, is possible, I provide a jack mechanism 59 which is attached beneath the central portion of the bed 3 and between the forward and rearward wheels of the tandem pairs of wheels. This mechanism is composed of a ground or foot plate 60 which is supported at each side by knee levers 61 and 61' and 62 and 62' at the front, and by similar levers 63 and 63' and 64 and 64' at the rear. The upper ends of the link levers 64 and 64' are pivotally attached to U-shaped bed braces 49 and 49'. The lower links, such as 61 and 61' and 63 and 63' are in each case pivotally attached to the top of plate 60. The upper and lower links of these link levers are joined by pins 65 and 66. Hydraulic cylinders 68 and 68' are pivotally attached by pins 65 which join the links 61 and 61' and 62 and 62'. These cylinders have pistons 69 and 69' pivotally attached to pins 66 and 66' which pivotally join levers 63 and 63' and 64 and 64'. This hydraulic mechanism operates the jack lifting mechanism from the position shown in Figure 3 to the raised position shown in Figure 4 wherein the plate 60 presses on the ground and raises the body bed 3.

Since there is little mechanical advantage afforded to the cylinders 68 and 68' in the position shown in Figure 3, I provide the booster jacks 72 and 72' which operate vertically and have cylinders 73 and 73' attached to the under face of body bed 3, whereas piston rods 74 and 74' press on, but are not attached to, the upper face of plate 60. When it is desired to move the bed upward from the position shown in Figure 3, the booster jacks first press plate 60 downward and then as the links 61 and 61' and 62 and 62' and 63 and 63' and 64 and 64' open, the cylinders 68 and 68' and piston 69 and 69' take over the movement until the position shown in Figure 4 is attained.

Normally shoes 18 and 18' ride on rollers 16 and 16' as well as rollers 16a and 16'a. However, in case of rebound of the parts when driving over a rough road, I provide a latch mechanism, shown particularly in Figures 10 and 11. Latch pins 80 and 80' are carried on pivotal links 88 and 88'. The latch pins 80 and 80' are normally held in latching position by a spring 87' which pushes on washer 83' and maintains the point of the pin in a slot 79' in shoe 18'. The spring 87' is contained within a tube 82' and compressed and compressed by cap 84'. There is a cross or T handle 81 at the outer end of pin 80'. When the pin is withdrawn against the compression of the spring 87' the handle 81' may rest in notches 85' on the latch rests 86' which are attached to the outer face of cap 84'. The above description reads on Figures 10 and 11. These shoe latches are shown in operating position in Figure 8 and indicated by numerals 81' in each instance.

In use the trailer bed 3, as shown in Figure 1, may be loaded in lowered position, as shown in solid lines. In this position the wheels 8 and 9 and 8' and 9' are moved to the outer positions, shown in solid lines in Figure 2, and the bed 3 is lowered by the hinging action of the wheel arms and by the lowering action of the jack 59. After loading the bed 3 is raised by operation of jack 59 using first the cylinders 73 and 73' and acting on pistons 74 and 74' and then the hydraulic cylinders 68 and 68' operating through pistons 69 and 69'. It is to be understood that these cylinders are connected through proper lines and fittings (not shown) to a source of oil under pressure.

Figure 2:
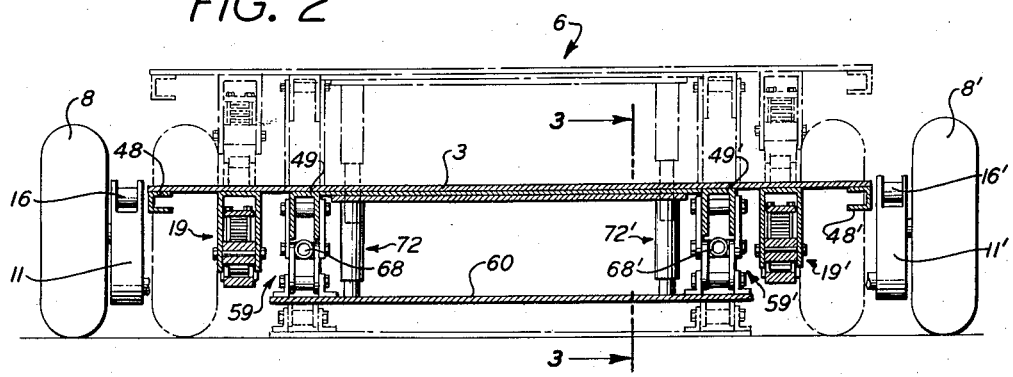
Figure 2 is a transverse view of the wheel-supporting mechanism and the body bed lifting mechanism, said section being taken substantially on line 2—2, Figure 1; drawn on an enlarged scale.

When the bed 3 is raised to the position shown in Figure 4 the wheels 8 and 8' and 9 and 9' are drawn inward to riding position as shown in dotted lines, Figure 2, and in solid lines, Figure 5. In this position the wheel arm rollers 16, 16', 16a and 16'a fit under shoes 18 and 18'. The rollers are retained against lateral movement by flanges 89 and 89' on each of the rollers. The bed 3 is then sprung by the springs 20 and 20' and the wheels are said to be in running position.

Thereafter all lifting jacks 59 and 59' are operated to withdraw plate 60 upward under the bed and the trailer is free to move on its wheels.

I claim:

1. An elevatable bed vehicle having a flat bed, springs laterally positioned beneath said bed supporting shoes, laterally disposed tandem pairs of wheels journalled on spindles carried on wheel arms pivotally mounted on transversely movable expansible elements attached to the under face of said bed; said wheel arms having rollers at their free ends adapted to contact and ride on said spring shoes when in contracted position beneath said bed; power operated means for operating said expansible elements and moving said wheels and wheel arms laterally from said contracted position to an expanded position beyond the lateral edges of said bed, so that the bed can be lowered while said wheel arms pivot on said expansible members, and a power operated jack centrally attached to the under side of said bed, having a foot plate adapted to bear on the ground beneath said bed and lift said bed so that the weight of the bed is removed from said wheels and wheel arms and so that said wheels may be moved by said expansible elements from beneath said bed, and withdrawn to a position beneath it.

2. In a semi-trailer having a flat bed, mechanism for raising and lowering said bed composed of wheel support and springing mechanism including longitudinally extending springs pivotally attached at their mid portions to lateral portions of the under side of said bed, shoes having flat under faces attached to the ends of said springs, tandem pairs of wheels beneath each side of said bed journalled on spindles on the free ends of pairs of pivotally mounted wheel arms, transverse telescoping expansible members attached to the under side of said bed having stub shafts at their outer ends journalled in said wheel arms and disposed so that the wheel arms of each pair extend toward each other, hydraulically operated mechanism for expanding and contracting said telescoping mechanism to move said fore and aft tandem pairs of wheels from contracted position beneath said bed to expanded position beyond the lateral edges of said bed, stops on said expansible mechanism for limiting outward movement of said mechanism, latches operating on said expansible mechanism for latchably detaining said mechanism in contracted position, rollers on the free ends of said wheel arms adapted to bear upward on the under face of said spring shoes so that the weight of the bed is supported through said springs and carried on said wheel arms and wheels, and a hydraulically operated jack mechanism beneath said truck bed for raising the bed, independently of said wheel supporting mechanism, so that said tandem pairs of wheels can be expanded from contracted position beneath said bed to expanded position beyond the lateral edges of said bed.

3. In a semi-trailer having a flat bed, mechanism for raising and lowering said bed composed of wheel support and springing mechanism including longitudinally extending springs pivotally attached at their mid portions to lateral portions of the under side of said bed, shoes having flat under faces attached to the ends of said springs, tandem pairs of wheels beneath each side of said bed journalled on spindles on the free ends of pairs of pivotally mounted wheel arms, transverse telescoping expansible members attached to the under side of said bed having stub shafts at their outer ends journalled in said wheel arms and disposed so that the wheel arms of each pair extend toward each other, hydraulically operated mechanism for expanding and contracting said telescoping mechanism to move said fore and aft tandem pairs of wheels from contracted position beneath said bed to expanded position beyond the lateral edges of said bed, stops on said expansible mechanism for limiting outward movement of said mechanism, latches operating on said expansible mechanism for latchably detaining said mechanism in contracted position, flanged rollers on the free ends of said wheel arms adapted to bear upward on the under face of said spring shoes so that the weight of the bed is supported through said springs and carried on said wheel arms and wheels, means for latching said wheel arm rollers to said shoes, and a hydraulically operated jack mechanism beneath said truck bed for raising the bed, independently of said wheel supporting mechanism, consisting of a ground plate attached to the underside of said bed by hinged links, horizontally disposed hydraulic cylinders operating on the hinged joints of said links to raise and lower said plate, and a vertically operating booster jack secured to the tractor bed and having a ram adapted to press directly downward on said plate during the first portion of its downward movement, so that the weight of the trailer may be borne on said plate and said tandem pairs of wheels can be expanded from contracted position beneath said bed to expanded position beyond the lateral edges of said bed.

4. An elevatable bed vehicle having a flat bed, shoes laterally positioned beneath said bed, laterally disposed tandem pairs of wheels journalled on spindles carried on wheel arms pivotally mounted on transversely movable expansible elements attached to the under face of said bed; said wheel arms having their free ends adapted to contact and ride on said shoes when in contracted position beneath said bed; means for operating said expansible elements and moving said wheels and wheel arms laterally from said contracted position to an expanded position beyond the lateral edges of said bed, so that the bed can be lowered while said wheel arms pivot on said expansible members, and a jack centrally attached to the under side of said bed, adapted to bear on the ground beneath said bed and lift said bed so that the weight of the bed is removed from said wheels and wheel arms and so that said wheels may be moved by said expansible elements from beneath said bed, and withdrawn to a position beneath it.

5. An elevatable bed vehicle having a bed, laterally disposed wheels journalled on spindles carried on wheel arms pivotally mounted on transversely movable expansible elements attached to the under face of said bed; said wheel arms having their free ends adapted to contact and ride beneath said bed when in contracted position; means for operating said expansible elements and moving said wheels and wheel arms laterally from said contracted position to an expanded position beyond the lateral edges of said bed, so that the bed can be lowered while said wheel arms pivot on said expansible members, and a jacking means on said bed adapted to bear on the ground beneath said bed and lift said bed so that the weight of the bed is removed from said wheels and wheel arms and so that said wheels may be moved from beneath said bed, and withdrawn to a position beneath it.

No references cited.